June 27, 1967  P. ZASADNY ETAL  3,328,001

ELECTRIC KITCHEN APPLIANCE

Filed Oct. 8, 1965  3 Sheets-Sheet 3

Inventors
Otto J. Cousins
Peter Zasadny
By
George R. Clark Atty

United States Patent Office 3,328,001
Patented June 27, 1967

3,328,001
ELECTRIC KITCHEN APPLIANCE
Peter Zasadny, Oak Park, and Otto J. Cousins, Chicago, Ill., assignors to Sunbeam Corporation, Chicago, Ill., a corporation of Illinois
Filed Oct. 8, 1965, Ser. No. 494,223
3 Claims. (Cl. 259—1)

ABSTRACT OF THE DISCLOSURE

A combination electric hand mixer and knife wherein both the rotary beaters and the reciprocating knife blades are driven by the mixer motor off the front end of the mixer.

This invention relates to an electric kitchen appliance, and more particularly, to a combination electric knife and hand mixer.

A combination electric hand mixer and knife is disclosed and claimed in copending Du Bois et al. patent application Ser. No. 464,286 filed June 16, 1965 and assigned to the same assignee as the instant patent application. In that copending patent application, the illustrated form of the invention comprises a combination electric knife and hand mixer wherein the mixer beaters and knife blades are driven off opposite ends of the electric motor shaft of the appliance. In the instant invention the combination appliance has its mixer beaters and knife blades driven off the front end of the device. That is to say, the knife blades are driven off the same end of the motor shaft of the hand mixer which drives the mixer beaters.

The invention will be better understood by considering the following description taken in connection with the accompanying drawings, and its scope will be pointed out in the appended claims.

In the drawings, the FIG. 1 is a broken away sectional view of one form of the invention taken along the section line 1—1 of FIG. 2;

FIG. 4 is a perspective view of one of the blade drive carriers.

Figure 1:
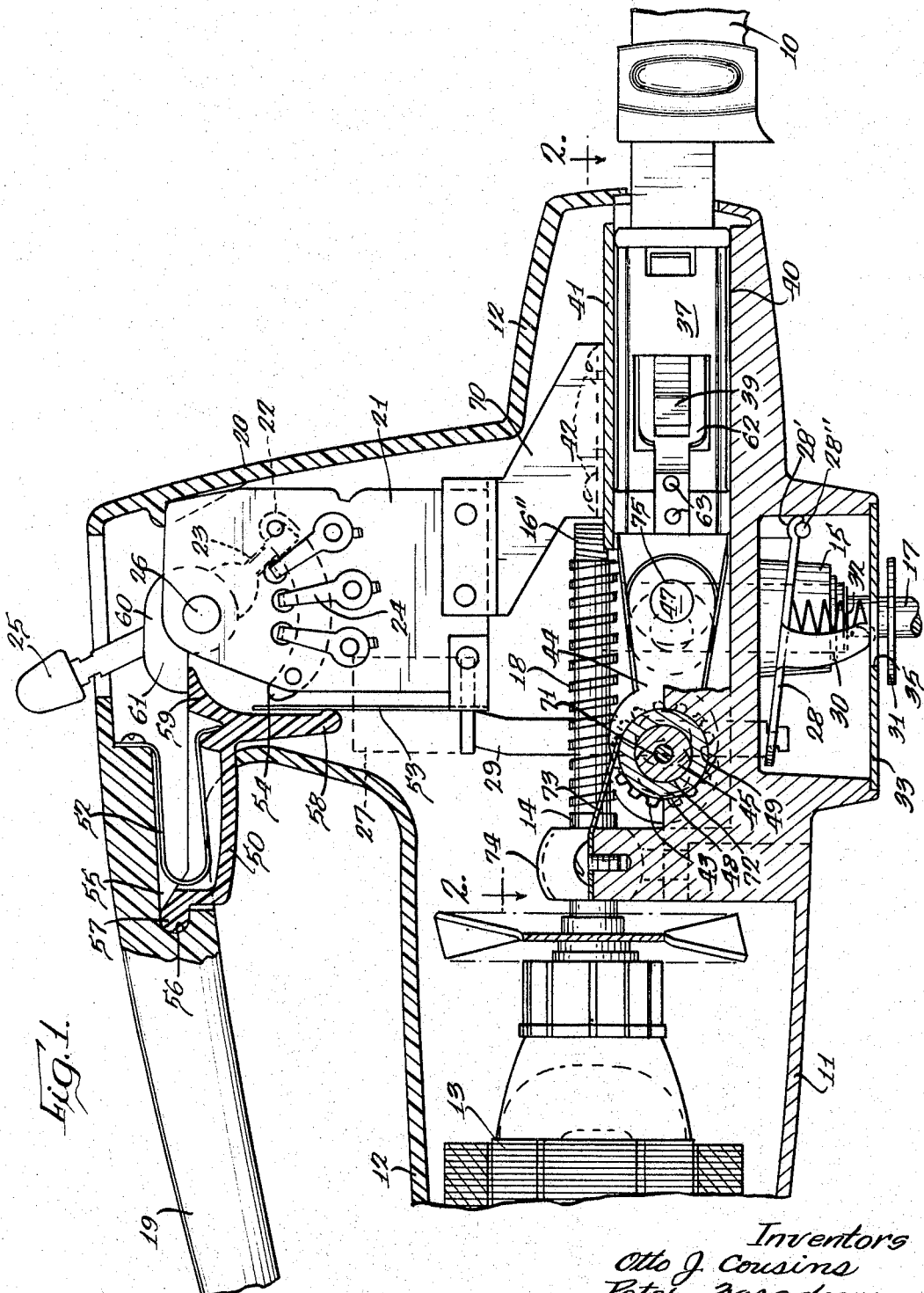

The device illustrated in the drawings comprises a conventional hand mixer which has been designed to have a pair of knife blades 10 driven off the front end of the hand mixer. The hand mixer part of the combination appliance will be generally described first. The hand mixer comprises a base member 11 and a cover member 12. An electric motor 13 is positioned inside the casing or housing defined by the bottom and top members 11 and 12. The rotary armature shaft 14 of the motor 13 extends lengthwise of the casing or housing which is generally elongated. At the front end of the device a pair of spindle bearings 15 are integrally formed in the bottom base or frame member 11. Positioned inside the bearings 15 are a pair of combination worm gears and hollow spindles 16. The hollow spindle portions of parts 16 are indicated by reference numerals 16′, and the worm gear portions thereof are indicated by reference numerals 16″.

When the device is being used the housing or casing is generally horizontally disposed. Therefore the parts 15 and 16 have vertical axes. The hollow spindle portions 16′ are adapted to removably receive a pair of mixer beaters 17. The front end of the motor armature shaft 14 has a worm 18 form thereon. When viewing the drawings, and more particularly FIGS. 1 and 2, the front end of the device is the right hand end. The worm 18 extends to between the worm gear portions 16″ for drive engagement therewith in order to rotate the mixer beaters 17.

Figure 2:
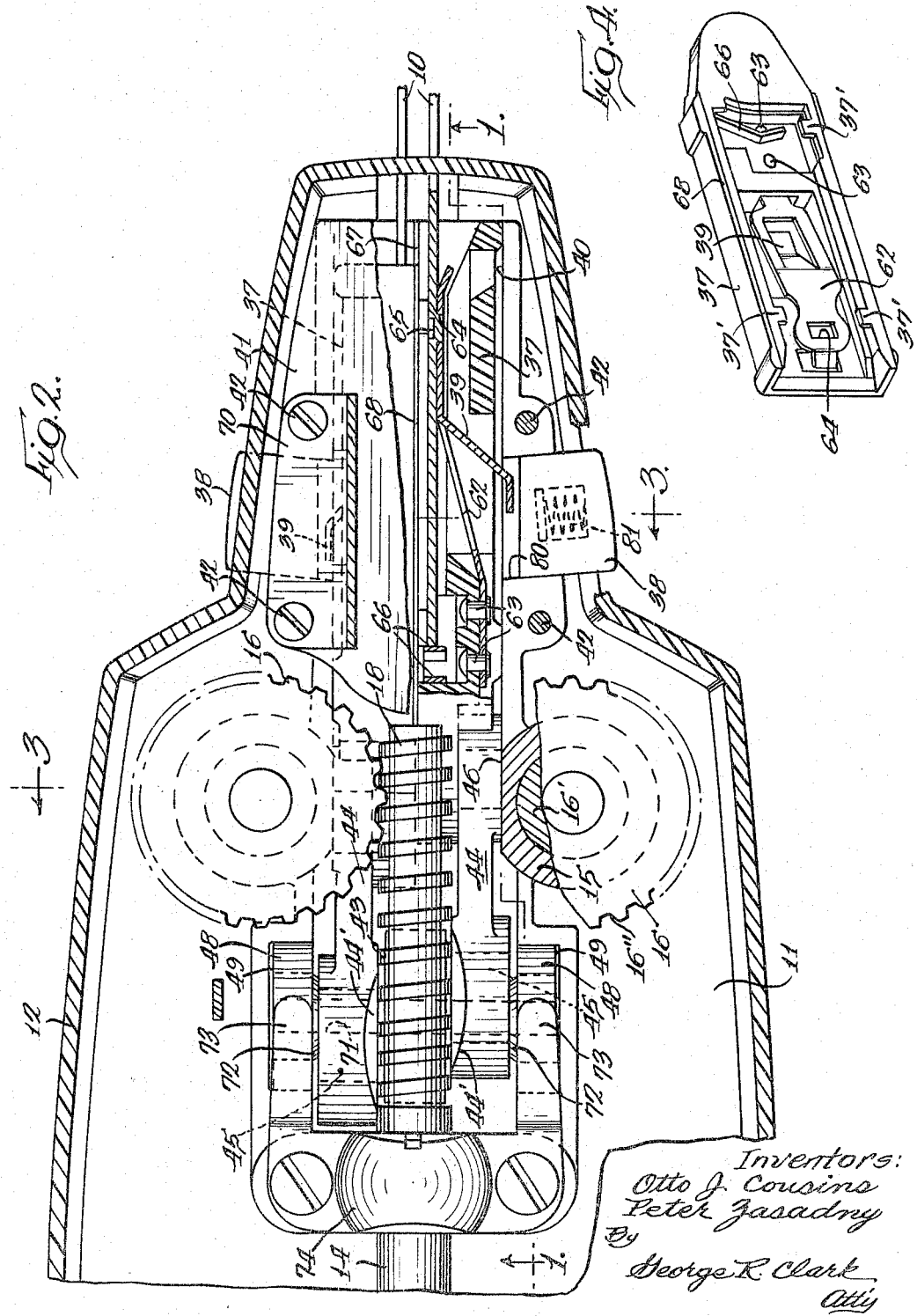
FIG. 2 is a broken away sectional view thereof taken along the section line 2—2 of FIG. 1.
Figure 3:
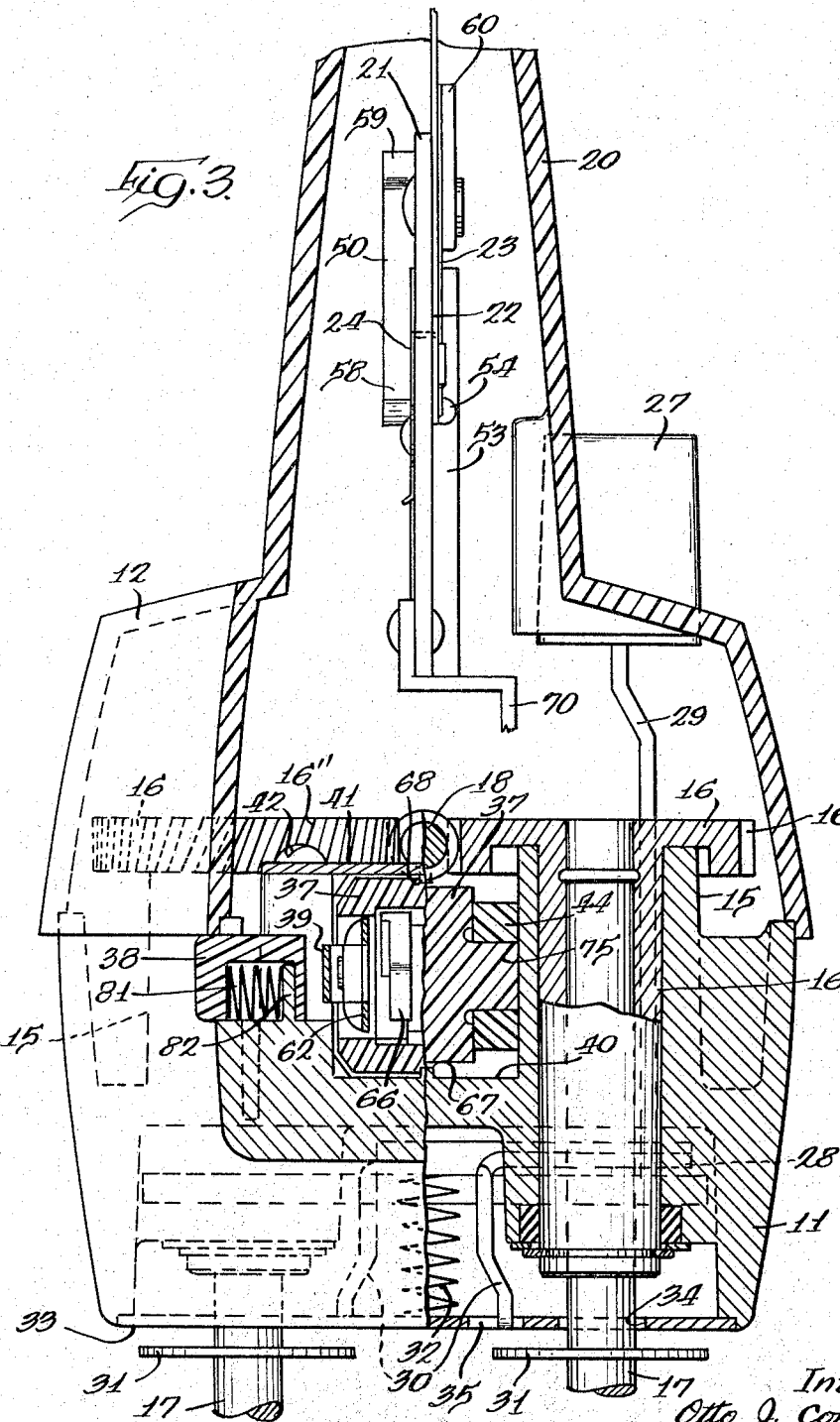
FIG. 3 is a sectional view of the device taken along the section line 3—3 of FIG. 3.

The combination appliance is provided with a generally elongated hand grip 19 which extends lengthwise of the device in space relationship with respect to the cover member 12. At its front end the hand grip 19 is connected to the cover member 12 by a hollow vertical post 20. The parts 19, 20, and 12 may be integrally formed with each other. An electric control switch for the motor 13 is positioned in the hollow post 20. The switch is well known in the art and comprises a terminal board 21 nested in the hollow post 20. A bus bar 22 is provided on the terminal board 21. A switch contact arm 23 slides along the bus bar 22 and is in continuous engagement therewith. Also provided on the board 21 are a plurality of spaced electric contacts 24 which are connected to different taps in the electric windings of the electric motor 13. The speed of the motor 13 is varied by placing the switch contact arm 23 in engagement with different ones of the tapped contacts 24. For purposes of manually varying the speed, a speed control knob 25 is located on the top of the post 20. In FIG. 1 the switch is indicated in off position. Moving the knob 25 in a forward direction will cause the contact arm 23 to swing in a rearward direction about a pivot axis 26 to successively engage the tapped contacts 24.

The details of the just described electric switch are more fully described in Jepson Patent 2,987,636 assigned to the same assignee as the instant invention.

For purposes of manually ejecting the mixer beaters 17 a beater ejector knob 27 is provided at the front end of the device. An ejector plate 28 is located beneath the bottom member 11 in the area of the mixer beaters. The front end of plate 28 is provided with a pair of integral trunnion portions 28′ which are pivoted on integral bearing portions 28″ of the base 11. The rear end of plate 28 is connected to ejector knob 27 by an elongated and generally vertically extending member 29. When knob 27 is depressed the plate 28 is lowered to disengage the mixer beaters 17 from the hollow spindles 16′. This is accomplished by a pair of integral fingers 30 formed on the plate 28. The fingers 30 depend from the plate 28 towards shoulders or washers 31 fixed on the mixer beaters 17. When plate 28 is moved down the fingers 30 will strike the shoulders 31 to forcibly remove the mixer beaters 17 from the hollow spindles 16′. The beater ejection mechanism is biased to off position by a spring 32 disposed between plate 28 and a cover plate 33 positioned beneath plate 28. The cover plate 33 of course is provided with apertures 34 for passing the mixer beaters to the hollow spindles 16′, and apertures 35 for passing the ejection fingers therethrough toward the shoulder 31.

The knife blades 10 and the drive mechanism therefor is similar to an electric knife currently being manufactured and marketed by the assignee of the instant application. In addition, the details thereof are particularly described in pending patent application Ser. No. 532,261 filed Mar. 7, 1966 by Cousins et al. for Electric Knife and assigned to the same assignee. Therefore, only so much thereof will be described as is necessary for a clear understanding of the invention, and more particularly, the integration thereof into the front end of the hand mixer. When the appliance is being used the user grips the device by the hand grip 19 and holds the device ahead or in front of his body. In other words, when viewing FIGS. 1 and 2 the right hand end or front portion thereof is directed away from the user. This front end of the device is provided with a pair of knife blade holders or carriers 37. The carriers 37 are disposed in front of the worm gear and spindle assembly. Carriers 37 are adapted to be reciprocated in opposite directions lengthwise of the appliance. They face each other and the pair of blades 10 are removably received therebetween. For purposes of releasing the blades 10 a pair of blade release buttons 38 are provided on opposite sides of the front end of the combination appliance. Depressing buttons 38 results in squeezing of springs 39 to disengage the blades 10 from their locked position in the carriers 37. The carriers 37 are nested in a channel shaped groove 40 formed in the bottom member 11. That is to say, groove 40 is a slide guideway for carriers 37. The carriers are retained in the guideway 40 by a cover plate 41 which is superimposed over the carriers 37 and suitably fastened to the bottom member 11 by means such as screws 42.

The blade carriers 37 are reciprocated back and forth by the worm 18 by a drive connecting mechanism comprising a crank worm gear 43 and a pair of connecting rods 44. The crank worm gear 43 is disposed beneath worm 18 and behind the spindle bearings 15. Its axis of rotation is disposed in a horizontal plane crosswise of the lengthwise axis of the appliance housing or casing. On its opposite sides the crank worm gear 43 is provided with a pair of eccentrics or cranks 45. The connecting rods 44 extend lengthwise of the appliance beneath the worm gears 16″ and between the spindle bearings 15. In order to provide clearance for the connecting rods 44 the outside of the facing portions of the spindle bearings 15 are cut away as indicated by reference numeral 46 (see FIG. 2). At their front ends the connecting rods 44 are pivotally connected to the rear ends of the blade carriers 37 on a pivot axis 47 (see FIG. 1). The rear ends of connecting rods 44 are journalled on the cranks 45. The opposite lateral ends of the combination worm gear and crank 43 are positioned in bearings 48 which are seated in integral bearing seats 49 formed along opposite sides of the base member 11. In view of the illustrated integration of the knife blade drive mechanism into the front end of the hand mixer the existing worm 18 is utilized to drive the knife blades and the length of the combination appliance is not appreciably increased over that required just for the hand mixer mechanism per se. In addition, in view of the customary manner and usage of hand mixers it is logical to the housewife to have the knife blades 10 located at the front end of the device. The arrangement of the parts is such that an electrical knife feature is provided in the hand mixer without an appreciable cost over the hand mixer per se. Furthermore, driving of the knife blades off the front end of the hand mixer makes it feasible to provide all the necessary controls adjacent to the hollow post 20 for convenient operation by the housewife in a manner to be described shortly after first additionally describing some further details of the blade drive mechanism.

One of two blade carriers 37 is shown in perspective in FIG. 4. They are the same, so what is said with respect to one is also true of the other. The spring 39 is actually a punched and turned up finger of a larger spring 62. At one end the spring 62 is fastened to carrier 37 by rivets 63. At its free end the spring 62 has a notch 64 which is adapted to receive a lug 65 of the blade 10. The shank of blade 10 is inserted into the carrier 37 between spring 62 and a plurality of integral lugs 37′ formed along opposite edges of the carrier 37. A bent spring 66 is provided at the closed end of carrier 37. When blade 10 is inserted into carrier 37 the inner end of the blade will butt up against spring 66 and compress it slightly. At this time the lug 65 will be aligned with hole 64 and snap therein whereby the carrier and blade are drive connected to each other. In releasing the blade, when the outer end of finger 39 is squeezed the junction portion between parts 39 and 62 will pivot or rock against the blade to cause its outer end at the hole 64 to move away from the blade to separate lug 65 from a hole 64. In this condition the loaded springs 66 will urge the blade out of carrier slightly so that lug 65 and hole 64 do not re-register with each other upon release of spring finger 39. Therefore, thereafter the blades are free to be withdrawn from carriers 37.

The release buttons 38 are mounted in guide grooves 80 formed in opposite sides of base 11. Buttons 38 are hollow on their underside and have a spring 81 and stop lug 82 positioned therein. Lug 82 is integral with base 11. Springs 81 are positioned between the lugs 82 and the outer ends of buttons 38 to bias them outwardly, and lugs 82 stop the buttons 38 in their outwardly spring biased direction of movement.

The blade drive and carrier members are nested in the guideway 40. At its bottom the guideway 40 is provided with a ridge 67 which extends lengthwise of the guideway and sides in grooves 68 formed on the opposite edges of carriers for alignment purposes. A ridge 69 is formed on the underside of plate 41 for similar purposes. The switch plate 21 is supported off the plate 41 by a strap 70 fastened to plate 41 by screws 42.

The worm gear 43 and the connecting rods 44 are actually disposed beneath the plane of the worm gears 16″ and worm 18. The eccentrics or cranks 45 are integrally formed on opposite sides of worm gear 43. A pin 71 extends through the eccentrics 45 and the worm gear 43 through the latter's axis. The opposite ends of pin 71 have bearing collars 72 fixed thereon. The bearing collars 72 ride in the bearings 48 which are nested in the seats 49. The bearings 48 are retained nested in their seats 49 by retainer fingers 73 which are integral with a main bearing retainer 74. Retainer 74 is for the front bearing of the armature shaft 14. The eccentrics 45 rotate in the left hand and apertured ends of the connecting rods 44 when viewing FIGS. 1 and 2. At their right hand apertured ends the rods 44 and carriers are pivotally connected to each other by virtue of integral pivot pins 75 formed at the inner ends of the carriers 37. At their left hand ends the rods 44 are cut away slightly, as indicated by reference numerals 44′ so as to clear the teeth of the worm 18.

The details of the control system will now be described. An on-off switch control trigger 50 is provided on the device at the crotch between the post 20 and the hand grip 19. The trigger 50 is biased to off position by a generally U-shaped spring 52. In order to energize the device it is necessary to depress the trigger 50 and hold it depressed. When trigger 50 is squeezed it moves a switch contact leaf 53 to the right when viewing FIG. 1. Contact leaf 53 is supported off the switch board 21. When contact leaf 53 engages an extension 54 on the bus bar 22, the bus bar 22 is electrically live. The contact leaf 53 is connected to one end of the electrical windings of the motor 13 and the contacts 24 are connected to taps in the windings. Therefore, assuming the speed control knob 25 has been moved to engage the contact arm 23 with one of the contacts 24 the circuit is completed for energizing the motor by squeezing the trigger 50. In a conventional mixer the trigger 50 is omitted and one end of the electric motor windings is directly connected to the bus bar 22 instead of by way of the movable contact leaf 53.

The trigger 50 is positioned in a recess 55 formed in the underside of the forward portion of the hand grip 19. The rear end of recess 55 is provided with a seat 56 which receives a portion 57 of the trigger 50 to provide a pivotal mounting for the trigger 50. Trigger 50 is generally L-shaped and its downwardly directed leg 58 is the portion which directly actuates the contact leaf 53 to switch closed position. When the trigger 50 is released the spring 52 automatically moves the portion 58 away from the contact leaf 53 so that the latter automatically moves to the switch open position.

At the junction of the L-shaped trigger 50 a protuberance 59 is provided which extends to adjacent the axis 26 of the speed control switch. Mounted on this axis 26 is an interlock cam 60 for the trigger 50 and the speed control switch. The interlock cam 60 has an enlargement 61. When the speed control knob 25 is moved rearwardly to position the contact arm 23 in off position away from the right hand contact 24, see FIG. 1, the enlargement 61 comes down on top of the protuberance 59 so that the trigger 50 is locked in open position. In other words, with the speed control 25 moved to off position the trigger 50 can not be squeezed to energize the electric motor.

The purpose of the trigger 50 is to provide a safety feature to prevent accidental driving of the blades 10 after the electric extension cord for the appliance is plugged in to a wall outlet, assuming that the knob 25 has been moved or left in a position other than off position. In this state of affairs with the trigger 50 the blades 10 would not be driven other than by knowingly depressing the trigger 50. Of course, the recommended and proper usage of the appliance is to always move the knob 25 to its off position so as to interlock the trigger 50 in the off position prior to removing or inserting the mixer beaters or the knife blades.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What we claim as new and desire to secure by Letters Patent of the United States is:

1. In a motor operated hand mixer comprising an elongated casing which is horizontally disposed during use of said mixer, said mixer having a pair of removable mixer beaters depending from the bottom of one end of said casing and a horizontally extending spaced hand grip which is connected to the top of the same end of said casing, in combination therewith, a pair of removable elongated abutting knife blades, said mixer having means at said one end for receiving said blades and reciprocating the same in opposite directions lengthwise of said casing, said combination including an electric motor in said casing, said motor having a rotary armature shaft, said shaft extending lengthwise of said casing, a worm formed at one end of said shaft, a pair of combination worm gear and hollow spindles inside said casing and engaged with said worm for driving said beaters, said spindles being adapted to have said mixer beaters removably connected thereto, and said means comprising a pair of knife blade carriers inside said casing for reciprocating said blades, said carriers being adapted to have one end of said blades removably connected thereto, said carriers having a drive connection with said worm and said drive connection comprising another worm gear engaged with said worm, a crank formed on opposite sides of said another worm gear, and a connecting rod extending between each of said cranks and carriers, said first mentioned worm gears and said worm being disposed in a common horizontal plane, and said another worm gear being disposed beneath said worm and between said motor and spindles.

2. In a motor operated hand mixer comprising an elongated casing which is horizontally disposed during use of said mixer, said mixer having a pair of removable mixer beaters depending from the bottom of one end of said casing and a horizontally extending spaced hand grip which is connected to the top of the same end of said casing, in combination therewith, a pair of removable elongated abutting knife blades, said mixer having means at said one end for receiving said blades and reciprocating the same in opposite directions lengthwise of said casing, said combination including an electric motor in said casing, said motor having a rotary armature shaft, said shaft extending lengthwise of said casing, a worm formed at one end of said shaft, a pair of combination worm gear and hollow spindles inside said casing and engaged with said worm for driving said beaters, said spindles being adapted to have said mixer beaters removably connected thereto, and said means comprising a pair of knife blade carriers inside said casing for reciprocating said blades, said carriers being adapted to have one end of said blades removably connected thereto, said carriers having a drive connection with said worm and said drive connection comprising another worm gear engaged with said worm, a crank formed on opposite sides of said another worm gear, and a connecting rod extending between each of said cranks and carriers, said combination worm gear and spindles having vertical axes of rotation, said carriers being disposed at the front end of said casing ahead of said combination worm gear and spindles, said another worm gear having a horizontal axis of rotation and being disposed behind said combination worm gear and spindles, and said connecting rods extending from the cranks on said another worm gear to said carriers between said combination worm gear and spindles.

3. In a motor operated hand mixer comprising an elongated casing which is horizontally disposed during use of said mixer, said mixer having a pair of removable mixer beaters depending from the bottom of one end of said casing and a horizontally extending spaced hand grip which is connected to the top of the same end of said casing, in combination therewith, a pair of removable elongated abutting knife blades, said mixer having means at said one end for receiving said blades and reciprocating the same in opposite directions lengthwise of said casing, said combination including said hand grip being connected to said casing by a vertical hollow post, a switch in said hollow post for controlling the speed of said mixer, a thumb operated speed control knob disposed at the top of said post, and a switch control trigger disposed in said hand grip adjacent said post, and an interlock for said control knob and trigger operative to lock said trigger in off position when said control knob is moved to off position.

References Cited
UNITED STATES PATENTS

| | | | |
|---|---|---|---|
| 2,074,162 | 3/1937 | Bowman | 259—84 X |
| 2,187,272 | 1/1940 | Kochner | 74—724 |
| 3,152,398 | 10/1964 | Freeman | 30—272 |
| 3,240,966 | 3/1966 | Thompson | 310—50 |

WILLIAM I. PRICE, *Primary Examiner.*